United States Patent [19]

Strouse et al.

[11] Patent Number: 4,893,823
[45] Date of Patent: Jan. 16, 1990

[54] SEAL ASSEMBLY

[75] Inventors: Gary L. Strouse, Telford; Thorval L. Berg, Hatfield, both of Pa.

[73] Assignee: Greene, Tweed & Co., Kulpsville, Pa.

[21] Appl. No.: 287,958

[22] Filed: Dec. 21, 1988

[51] Int. Cl.⁴ ............................. F16J 9/06; F16J 15/32
[52] U.S. Cl. ....................................... 277/165; 92/247; 277/58; 277/188 A
[58] Field of Search ............... 277/188 R, 188 A, 165, 277/192, 198; 92/247, 240

[56] References Cited

U.S. PATENT DOCUMENTS

| | | | |
|---|---|---|---|
| 3,765,690 | 10/1973 | Sievenpiper | 277/121 |
| 4,027,816 | 6/1977 | Slator et al. | 277/205 X |
| 4,143,586 | 3/1979 | Zitting | 92/240 X |
| 4,229,013 | 10/1980 | Burke et al. | |
| 4,231,578 | 11/1980 | Traub . | |
| 4,268,045 | 5/1981 | Traub . | |
| 4,421,330 | 12/1983 | Burke . | |
| 4,566,702 | 1/1986 | Traub . | |
| 4,635,945 | 1/1987 | Beck | 277/165 X |

Primary Examiner—William A. Cuchlinski, Jr.
Assistant Examiner—Scott W. Cummings
Attorney, Agent, or Firm—Panitch Schwarze Jacobs & Nadel

[57] ABSTRACT

A seal assembly is disclosed for installation in an annular groove having inner and outer radial surfaces interconnected by an axial surface. The seal assembly is comprised of a generally annular energizer element formed of an elastomeric material and including a body portion and a generally radially extending sealing lip. The seal assembly further comprises a generally annular heel bearing element formed of a generally rigid material. Upon installation of the energizer element and heel bearing element into the annular groove, an annular void, generally triangular in cross section, is formed between the two seal elements. Upon the application of pressure at or above a predetermined pressure limit, the energizer element moves into the annular void drawing at least a portion of the sealing lip into the groove to reduce the axial width of the sealing lip contact area.

4 Claims, 2 Drawing Sheets

SEAL ASSEMBLY

BACKGROUND OF THE INVENTION

The present invention relates generally to multi-element seal assemblies for effecting a seal between relatively movable parts and, more particularly, to an improved, low pressure sealing element for use with such multi-element seal assemblies.

Multi-element seal assemblies, particularly such assemblies for use in providing a seal between relatively reciprocating surfaces, such as pistons and surrounding cylinders and/or piston rods and surrounding housings, are generally well known in the art. Such multi-element seal assemblies are disclosed in U.S. Pat. Nos. 4,421,330; 4,231,578; 4,268,045; and 4,566,702. These prior art seal assemblies generally include at least two interacting sealing elements: a low pressure sealing element formed of a relatively resilient, deformable sealing material, such as synthetic or natural rubber, and a high pressure sealing element formed of a relatively rigid sealing material, such as PTFE. Both the low pressure sealing element and the high pressure sealing element are generally annular and are typically installed in an annular sealing groove within one of the reciprocating surfaces with the groove opening facing the other surface. Typically, the low pressure sealing element seats against the bottom or base of the groove, with the high pressure sealing element positioned between at least a portion of the low pressure sealing element and the other reciprocating surface. As shown in the above-referenced patents, at least a portion of the low pressure sealing element, sometimes called the wiper or sealing lip, extends beyond the sealing groove. During low pressure operation (below a predetermined pressure limit), the wiper or sealing lip engages the other reciprocating surface to provide primary sealing. At higher pressures (at or above the predetermined pressure limit), the low pressure sealing element is forced by the pressure into the sealing groove, thereby partially withdrawing the wiper from engagement with the other reciprocating surface and correspondingly urging the high pressure sealing element into sealing engagement with the other reciprocating surface. In general, the pressure limit is determined by the specific material used to form the low pressure sealing element.

While such seal assemblies generally provide effective sealing at both low and high pressures, such seal assemblies, due to their structure, sometimes provide unnecessary friction upon the other reciprocating surface during high pressure operation. Such unnecessary friction, in some cases, is caused by the wiper of the low pressure sealing element not being effectively withdrawn into the groove, and in other cases may be due to the low pressure sealing element putting excess outward pressure upon the high pressure sealing element. In this manner, a portion of the sealing lip or wiper continues to engage the other reciprocating surface during high pressure operation and/or the high pressure sealing element tightly engages the other reciprocating surface, resulting in additional friction, as well as decreased life of the low pressure sealing element, due to premature wear. In addition, it has been determined that such prior art seal assemblies are often inefficient during the transition from high pressure operation to low pressure operation. More specifically, it has been determined that with such prior art seal assemblies, there is a delay in the complete reengagement of the low pressure sealing element with the other reciprocating surface as the operating pressure decreases. Such a delay or inconsistency may result in an unacceptable loss of fluid between the reciprocating surfaces.

The present invention comprises an improved seal assembly in which the low pressure sealing element is at least partially withdrawn from engagement with the other reciprocating surface during high pressure operation to provide decreased friction and enhanced life for the low pressure sealing element. The present invention also provides a low pressure sealing element which is more efficient and provides more effective sealing during the transition from high pressure operation to low pressure operation.

SUMMARY OF THE INVENTION

Briefly stated, the present invention comprises a seal assembly for installation in an annular groove having inner and outer radial surfaces interconnected by an axial surface. The seal assembly comprises a generally annular energizer element formed of an elastomeric material. The energizer element includes a body portion and a generally radially extending sealing lip to provide a low pressure seal when installed within the groove. The energizer element engages at least a portion of the axial surface of the groove and a first portion of the outer radial surface of the groove proximate the axial surface of the groove. The sealing lip extends beyond the groove for engagement with an element to be sealed to define a low pressure sealing lip contact area of a first predetermined axial width. The seal assembly further comprises a generally annular heel bearing element formed of a generally rigid material to provide a high pressure seal when installed within the groove. The heel bearing element engages at least a portion of the energizer element proximate the sealing lip and a second portion of the outer radial surface of the groove distal from the axial surface of the groove. A portion of the heel bearing element engages the element to be sealed with the energizer element, the heel bearing element and a third portion of the outer radial surface of the groove extending between the first and second portions thereof, establishing a first generally annular void. The annular void is generally triangular in cross section. Upon the application of pressure below a first predetermined pressure limit, the sealing lip of the energizer element functions to perform primary sealing. Upon the application of pressure at or above the predetermined pressure limit, the energizer element is compressed and a portion of the energizer element moves into the annular void, drawing at least a portion of the sealing lip into the groove to reduce the axial width of the low pressure sealing lip contact area and applying radial pressure upon the heel bearing element so that the heel bearing element performs the primary sealing function. The shape and location of the annular void is such that fluid within the annular void is forced out of the annular void by the energizer element and passes out of the groove between the outer radial surface of the groove and the heel bearing element.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings.

DESCRIPTION OF PREFERRED EMBODIMENT

Figure 1:
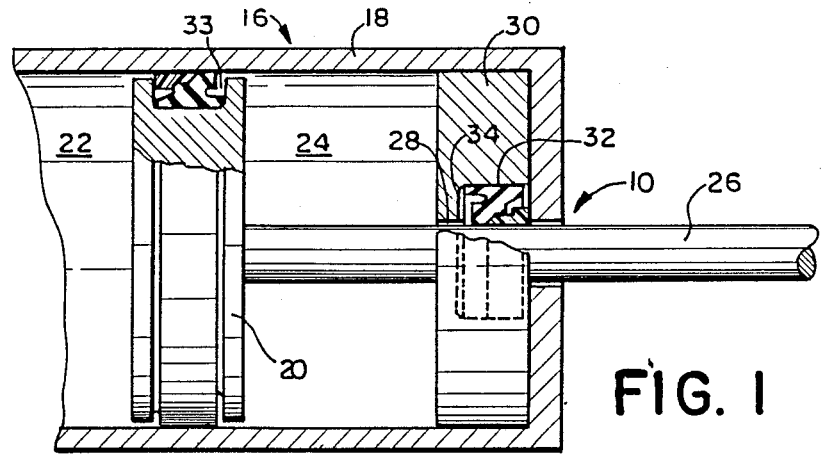
FIG. 1 is a sectional view of a piston and cylinder assembly illustrating uses of a preferred embodiment of the present invention.
Figure 4:
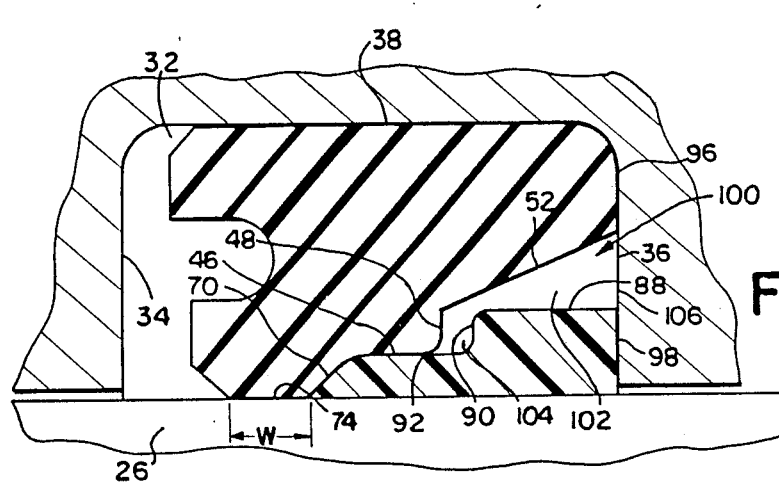
FIG. 4 is an enlarged sectional view of a portion of FIG. 1 showing a preferred embodiment of the seal assembly within a sealing groove of a rod seal.

Referring to the drawings, wherein like numerals indicate like elements throughout, there is shown in FIG. 1 a preferred embodiment of a seal assembly 10 in accordance with the present invention. As will hereinafter be described in greater detail, the seal assembly 10 includes a generally annular energizer element 12 and a generally annular heel bearing element 14. FIG. 1 illustrates just two of the various possible uses of a preferred embodiment of the seal assembly 10 in conjunction with a hydraulically actuated, generally cylindrical piston assembly 16. The piston assembly 16 includes a cylinder 18 and a piston 20 housed within the cylinder 18 and movable reciprocally with respect to the cylinder. The piston 20 separates the cylinder 18 into two variable sized cylindrical chambers 22 and 24. Attached to the piston 20 and extending through chamber 24 is a generally cylindrical piston rod 26. The piston rod 26 extends through a generally circular opening 28 on the closed end or head 30 of the cylinder 18. The cylinder head 30 includes a generally annular interior sealing groove 32 which contains the seal assembly 10. As best seen in FIG. 4, the sealing groove 32 has a first or inner radial surface 34 which is closest to chamber 24 and a second or outer radial surface 36 which is furthest from chamber 24. An axial surface 38 interconnects radial surfaces 34 and 36 of the sealing groove 32. Sealing groove 32 is generally open on its radially inner side. As shown in FIG. 1, a similar sealing groove 33 and seal assembly provide a seal between the piston 20 and the cylinder 18. However, the orientation of sealing groove 33 is such that the groove is open on its outer side and the orientation of the elements of the seal assembly is reversed from that of seal assembly 10.

In general, both chambers 22 and 24 are filled with fluid, such as hydraulic fluid, and movement of the piston 20 and piston rod 26 is accomplished by varying the respective pressure within the chambers 22 and 24 through the introduction of pressurized fluid to one or the other of the chambers 22 and 24. For example, the introduction of pressurized fluid into chamber 24 results in the piston 20 moving toward the left, when viewing FIG. 1, to reduce the size of chamber 22 and to enlarge the size of chamber 24. Chamber 22 may include a spring (not shown) to provide a return force for moving the piston 20 toward the right, when viewing FIG. 1, when the pressure within chamber 24 has been reduced. Of course, the rod 26 correspondingly moves with the piston 20.

The seal assemblies disclosed in the above-described patents, as well as related seal assemblies well known in the art, have been employed for the purpose of eliminating a thin film of fluid which adheres to the piston rod 26 as the piston rod 26 is extended out of the cylinder head 30. Typically, such prior art seal assemblies include a relatively soft, elastomeric sealing element having a sealing lip or wiper which engages the piston rod 26 during low pressure operations (i.e., when the piston rod 26 is moving out of the cylinder 18). Since such elastomeric sealing elements are not effective at high pressures, the prior art seal assemblies typically include a second, high pressure sealing element which engages and seals the piston rod 26 during high pressure operation (i.e., when the chamber 24 is subjected to high pressure and the piston rod 26 is moving into the cylinder 18). With such prior art seal assemblies, during low pressure operation the resilient nature of the low pressure sealing element in combination with the sealing groove 32 is generally sufficient to maintain the sealing lip in sufficient contact with the piston rod 26 to effectively wipe or remove fluid from the piston rod 26 as it moves out of the cylinder 18. The high pressure sealing element may also help to maintain the effectiveness of the sealing lip. Correspondingly, the application of high pressure within chamber 24 typically results in the low pressure sealing element being at least partially compressed into the sealing groove 32, resulting in a displacement of the high pressure sealing element out of the groove 32 and into firm sealing contact with the piston rod 26.

While prior art seal assemblies of this type are generally effective in accomplishing the desired sealing result, such prior art seal assemblies, during high pressure operation, tend to provide too much pressure on the high pressure sealing element, resulting in unnecessary friction being generated on the piston rod 26. In addition, it has been determined that, due to the geometry of the seal assembly, the low pressure sealing element is not always sufficiently withdrawn into the sealing groove 32 during high pressure operation, resulting in undesirable contact of a substantial portion of the sealing lip with the piston rod and, therefore, unnecessary wear being imposed upon the low pressure sealing element. The continued wear upon the low pressure sealing element results in an unnecessarily diminished life for the low pressure sealing element and, therefore, frequent replacement.

The present invention, by significantly changing the structure of the prior art seal assembly, overcomes these disadvantages to provide a seal assembly 10 having reduced friction during high pressure operation with an enhanced serviceable life for the low pressure sealing element 12.

Figure 2:
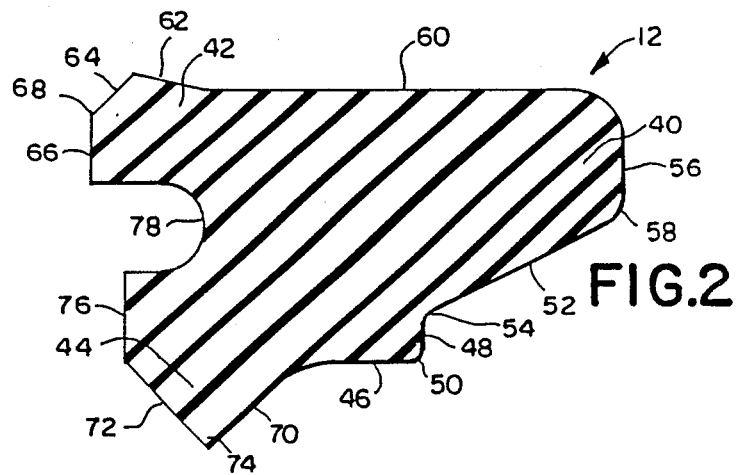
FIG. 2 is a sectional view of a preferred embodiment of an energizer element in accordance with the present invention.
Figure 3:
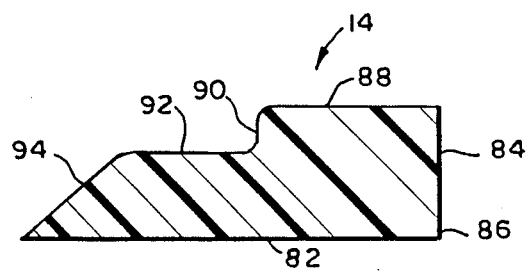
FIG. 3 is a sectional view of a preferred embodiment of a heel bearing element in accordance with the present invention.

FIGS. 2, 3 and 4 illustrate a preferred embodiment of the seal assembly 10, FIGS. 2 and 3 showing the energizer or low pressure sealing element 12 and the heel bearing or high pressure sealing element 14 separately, and FIG. 4 illustrating the two sealing elements 12 and 14 installed within sealing groove 32.

In describing the structure of the sealing elements 12 and 14, the term "axial surface" shall mean a surface which extends generally parallel to the axis of the sealing elements (left and right when viewing FIGS. 2, 3 and 4) and the term "radial surface" shall mean a surface which extends generally perpendicular to the axis of the sealing elements and generally parallel to a radius of the sealing element (up and down when viewing FIGS. 2, 3 and 4).

As previously indicated, the energizer or low pressure sealing element 12 is generally annular and is formed of a relatively soft, sealing elastomeric material such as natural or synthetic rubber. As best shown in FIG. 2, the energizer element 12 is generally Y-shaped in cross-section and includes a body portion 40 and first and second leg portions 42 and 44, respectively. The body portion 40 includes a first axial inner surface 46 and a first radial surface 48 having one end engaging one end of the first axial surface 46 at point 50. A first generally angled surface 52 has one end which engages the other end of the first radial surface at point 54. In the presently preferred embodiment, angled surface 52 extends at an angle of about 120 degrees with respect to the first radial surface 48. However, it will be appreciated by those skilled in the art that the angled surface 52 may extend at some other suitable angle, for example, an angle between 100° and 150°.

A second radial surface 56 has one end which engages the other end of the angled surface 52 at point 58. In the presently preferred embodiment, the angled surface 52 extends at an angle of approximately 120 degrees with respect to the second radial surface 56. However, it will be appreciated by those skilled in the art that the angled surface 52 may extend at some other angle, for example, an angle between 100° and 150°.

A second axial outer surface 60 has a first end which engages the other end of the second radial surface 56. In the presently preferred embodiment, the junction of the second axial outer surface 6 and the second radial surface 56 is generally curved to conform to the curvature of the corresponding portion of sealing groove 32 (see FIG. 4). However, the junction of the two surfaces 56 and 60 need not be curved.

The first leg portion 42 includes a second generally angled surface 62 having one end which engages the other end of the second axial outer surface 60. Similarly, a third angled or bevelled surface 64 has one end which engages the other end of the second angled surface 62 to establish a small portion of the energizer element 12 which extends slightly radially outwardly from the second axial outer surface 60. A third radial surface 66 has one end which engages the other end of the third angled surface 64 at point 68.

The second leg portion 44 includes a fourth generally angled surface 70 having one end engaging the other end of the first axial surface 46. A fifth generally angled surface 72 has a first end which engages the other end of the fourth angled surface to form a generally radially inwardly extending sealing lip 74. In the presently preferred embodiment, the fourth angled surface 70 is at an angle of approximately 135 degrees with respect to the first axial surface 46 and the angle between the fourth and fifth angled surfaces 70 and 72 is approximately 90 degrees. However, it will be appreciated by those skilled in the art that the angles of the various angled surfaces may vary.

A fourth radial surface 76 has one end which engages the other end of the fifth angled surface 72. A generally U-shaped surface 78 extends between the other ends of the third and fourth radial surfaces 66 and 76 generally between the leg portions 42 and 44 of the energizer element 12.

The heel bearing or high pressure sealing element 14 is formed of a generally rigid material, such as PTFE, NYLON, PEEK, filled PTFE or a similar material. As shown in FIG. 3, the high pressure sealing element is generally L-shaped in cross section and includes a first inner axial surface 82. A first generally radial surface 84 has one end which engages one end of the first axial surface 82 at point 86. A second outer axial surface 88 has one end which engages the other end of the first radial surface 84. A second radial surface 90 has one end engaging the other end of the second axial surface 88. In the presently preferred embodiment, the junction of the second radial surface 90 and the second axial surface 88 is generally curved for purposes which will hereinafter become apparent.

A third axial surface 92 has one end which engages the other end of the second radial surface 90. An angled surface 94 extends between the other end of the third axial surface 92 and the other end of the first axial surface 82. In the presently preferred embodiment, the angled surface 94 extends at an angle of approximately 45 degrees with respect to the first axial surface 82 so that, when the seal assembly 10 is installed within the sealing groove 32, the angled surface 94 of the high pressure sealing element 14 engages the corresponding fourth angled surface 70 of the low pressure sealing element 12 (see FIG. 4). Of course, the particular angle of angled surface 94 may vary in order to complement the angle of angled surface 70.

As best shown in FIG. 4, the seal assembly 10 is installed within the sealing groove 32 with the second or outer axial surface 60 and the second angled surface 62 of the low pressure sealing element 12 engaging the axial surface 38 of the sealing groove 32. Upon installation in the sealing groove 32, the small radially outwardly extending portion of the low pressure sealing element 12 formed by the intersection of angled surfaces 62 and 64 is generally flattened out and the first leg 42 of the low pressure sealing element 12 is correspondingly compressed. The second radial surface 56 of the low pressure sealing element 12 engages a first radially outer portion 96 of the outer radial surface 36 of the groove 32. In the presently preferred embodiment, the first portion 96 of the outer radial groove surface 36 engaged by the low pressure sealing element 12 comprises approximately one-third of the radial length thereof. However, a larger or smaller portion of the groove surface 36 could alternatively be engaged.

The first radial surface 84 of the high pressure sealing element engages a second radially inner portion 98 of the outer radial surface 36 of the sealing groove 32 proximate the open end of sealing groove 32. Again, the portion of the sealing groove surface 36 engaged by the high pressure sealing element 14 is approximately one third of the length thereof. As previously indicated, the angled surface 94 of the high pressure sealing element 14 engages at least a portion of the fourth angled surface 70 of the low pressure sealing element 12 to provide support for the sealing lip 74. Similarly, the first axial surface 46 of the low pressure sealing element 12 engages at least a portion of the third axial surface 92 of the high pressure sealing element 14 to provide support for the low pressure sealing element 12.

FIG. 4 shows the seal assembly 10 installed within the sealing groove 32 of the cylinder head 30 with the sealing lip 74 and the inner axial surface 82 of the high pressure sealing element 14 engaging the piston rod 26. The sealing lip 74 engages the piston rod 26 to define a low pressure sealing lip contact area having a first predetermined axial width W. FIG. 4 illustrates the seal assembly 10 under no pressure, i.e., no movement of the piston rod 26. As shown in FIG. 4, when the high and low pressure sealing elements 12 and 14 are installed within the sealing groove 32, a generally annular void 100 is created therebetween. In the presently preferred embodiment, the void 100 is comprised of a first area or void section 102 which is generally triangular in cross section and a second area or void section 104 which is generally rectangular in cross section and communicates with the first void section 102. The triangular void section 102 is generally established by the second axial surface 88 of the high pressure sealing element 14, the first angled surface 52 of the low pressure sealing element 12 and a third portion 106 of the outer radial surface 36 of the sealing groove 32. The third portion 106 of the sealing groove surface 36 extends between first and second portions 96 and 98 and includes approximately one-third of the radial length thereof. Similarly, the rectangular void section 104 is established by the second radial surface 90 and a portion of the third axial surface 92 of the high pressure sealing element 14 and the first radial surface 48 of the low pressure sealing element 12.

The purpose of the annular void 100 is to provide an area for receiving a portion of the low pressure sealing element 12 when the seal assembly 10 is subjected to high pressure above a predetermined pressure limit. As previously indicated, due to the relatively soft nature of the low pressure sealing element 12, when subjected to high pressure, at least a portion of the low pressure sealing element is compressed into the sealing groove 32. With some prior art seal assemblies of the type described above, no such annular void was provided so, under high pressure operation, the low pressure seal was merely compressed within the limited area available, which sometimes was not enough to permit the sealing lip to be sufficiently withdrawn from engagement with the piston rod. By compressing the low pressure sealing element in this manner, the reaction of the resilient material resulted in the application of substantial radially inwardly directed pressure upon the high pressure sealing element. While it is desirable to have such radially inwardly directed pressure to maintain good sealing engagement between the high pressure sealing element and the rod, the amount of pressure applied by the prior art seal assembly was sometimes excessive, resulting in the imposition of additional, unnecessary friction between the high pressure sealing element and the piston rod. The present invention, by providing void 100 between at least a portion of the sealing elements 12 and 14, presents an area for receiving a portion of the low pressure sealing element during high pressure operation. The area of the void is sufficient to permit the displacement of enough of the body portion 40 of the low pressure sealing element 12 to allow for withdrawal of a substantial portion of the sealing lip 74 from engagement with the piston rod 26. In this manner, the axial width W of the low pressure sealing lip contact area is reduced (see FIG. 5). In addition, the shape of the void 100 is such that movement of part of the body portion 40 of the low pressure sealing element into the void 100 results in the application of relatively even radially inwardly directed pressure along essentially the entire axial length of the high pressure sealing element 14. Because of the availability of the void 100 for receiving some of the body portion 40 of the low pressure sealing element 12, the pressure applied by the low pressure sealing element 12 to the high pressure sealing element 14 is diminished over what the pressure would be in the absence of annular void 100, thereby providing an effective high pressure seal while reducing the amount of friction created between the high pressure sealing element 14 and the piston rod 26. In addition, since the forces applied by the low pressure sealing element 12 to the high pressure sealing element 14 are generally equal along substantially the entire axial length of the high pressure sealing element, the corresponding return forces imposed upon the low pressure sealing element 12 are also generally equal. Thus, as the sealing element transitions 12 from high pressure operation to low pressure operation, the low pressure sealing element promptly returns to its original position with the sealing lip 74 again sealingly engaging the piston rod 26 over the contact area with the predetermined axial width W.

Figure 5:
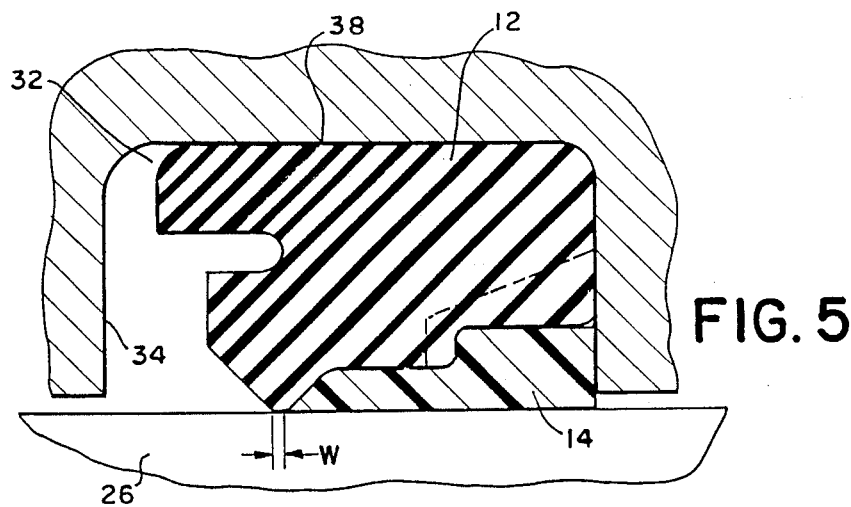
FIG. 5 is a view similar to FIG. 4, but illustrating the seal assembly under the application of high pressure.

It is noted that some prior art seal assemblies have provided a type of void between the high pressure and low pressure sealing elements for receiving a portion of the low pressure sealing element during high pressure operation. However, heretofore, such voids have been "inboard" voids. That is, such voids have been positioned within either the low pressure or high pressure sealing element at a location where the void is surrounded by the sealing elements. In such prior art seal assemblies, such inboard voids tend to trap hydraulic fluid or other fluids, such as air, therein, thereby reducing the space available for receiving the low pressure sealing element during high pressure operation. Because of the generally triangular shape of void 100 and the generally open low pressure end of the void, any fluid within void 100 (including air) is displaced by the low pressure sealing element 12 as it moves into the void 100. The displaced fluid passes between the high pressure sealing element 14 and the outer radial groove surface 38 without inhibiting the movement of the low pressure sealing element 12 into the void 100. In addition, as best shown in FIG. 5, the shape of the annular void 100 permits the low pressure sealing element 12 to move into the void 100 in two directions. Thus, the first radial surface 48 of the low pressure sealing element 12 moves axially (toward the right when viewing FIG. 4) to engage the second radial surface 90 of the high pressure sealing element 14. Correspondingly, the first angled surface 52 of the low pressure sealing element 12 moves generally radially inwardly to engage the outer axial surface 88 of the high pressure sealing element 14. The amount of movement of first angled surface 52 varies along its length, the portion of angled surface 52 proximate point 54 moving only a relatively small amount and the portion proximate point 58 moving a relatively large amount. The net result in the variation of movement of angled surface 52 into void 100 is that the low pressure sealing element 12 effectively pivots about point 54 in a clockwise direction, when viewing FIG. 4, to help withdraw the sealing lip 74 from complete engagement with the piston rod 26.

Figure 6:
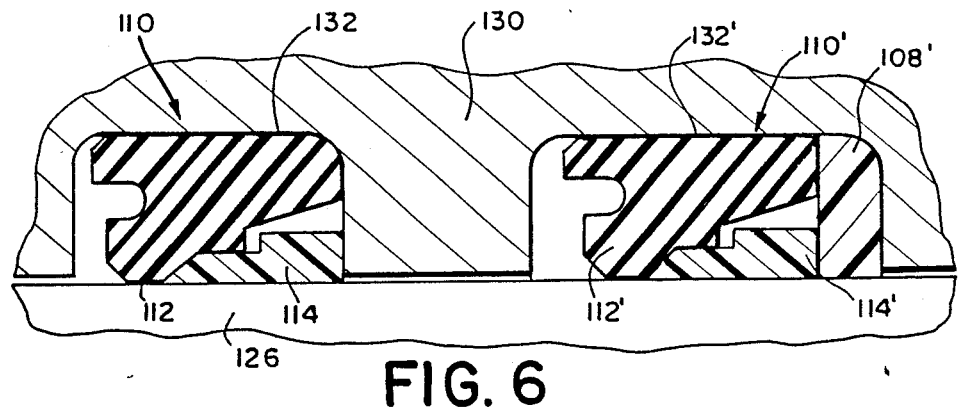
FIG. 6 illustrates an alternate embodiment of the present invention in which a pair of seal assemblies are employed in tandem.

FIG. 6 shows an alternate embodiment of the present invention. In the embodiment shown in FIG. 6, a pair of sealing grooves 132 and 132', are employed in tandem within the cylinder head 130. Sealing groove 132 includes a seal assembly 110 which is substantially the same as seal assembly 10 described above. Sealing groove 132' includes a seal assembly 110' which includes an energizer or low pressure sealing element 112' and a heel bearing or high pressure element 114', essentially the same as described above in connection with seal assembly 10. However, seal assembly 110' further includes a generally rigid additional anti extrusion ring or back-up element 108'. Seal assemblies 110 and 110' function in substantially the same manner as discussed above with respect to seal assembly 10.

From the foregoing description, it can be seen that the present invention comprises an improved seal assembly formed of at least two annular sealing elements with a particularly shaped annular void therebetween. It will be recognized by those skilled in the art that changes may be made to the above-described embodiments of the invention without departing from the broad inventive concepts thereof. It is understood, therefore, that this invention is not limited to the particular embodiments disclosed, but is intended to cover all modifications which are within the scope and spirit of the appended claims.

We claim:

1. A seal assembly for installation in an annular groove having an inner radial surface and an outer radial surface interconnected by an axial surface, the seal assembly comprising:

a generally annular energizer element formed of an elastomeric material including a body portion and a generally radially extending sealing lip to provide a low pressure seal when installed within the groove, the energizer element engaging at least a portion of the axial surface of the groove and a first portion of the outer radial surface of the groove proximate the axial surface of the groove, the sealing lip extending beyond the groove for engagement with an element to be sealed to define a low pressure sealing lip contact area of a first predetermined axial width; and a generally annular heel bearing element formed of a generally rigid material to provide a high pressure seal when installed within the groove, the heel bearing element engaging at least a portion of the energizer element proximate the sealing lip and engaging a second portion of the outer radial surface of the groove distal from the axial surface of the groove, a portion of the heel bearing element engaging the element to be sealed with the energizer element, the heel bearing element and a third portion of the outer radial surface of the groove extending between the first and second portions thereof establishing a first generally annular void, the annular void being generally triangular in cross section whereby upon the application of pressure below a first predetermined pressure limit the sealing lip of the energizer element functions to perform primary sealing and upon the application of pressure at or above the predetermined pressure limit the energizer element is compressed and a portion of the energizer element moves into the annular void, drawing at least a portion of the sealing lip into the groove to reduce the axial width of the low pressure sealing lip contact area and applying radial pressure upon the heel bearing element so that the heel bearing element performs the primary sealing function, the shape and location of the annular void being such that fluid within the annular void is forced out of the annular void by the energizer element and passes out of the groove between the outer radial surface of the groove and the heel bearing element.

2. The seal assembly as recited in claim 1 wherein the heel bearing element includes a generally axial surface and the energizer element includes a surface extending at a first predetermined angle with respect to said axial heel bearing element surface to establish said void.

3. A seal assembly for installation in an annular groove having an inner radial surface and an outer radial surface which are interconnected by an axial surface, the seal assembly comprising:

a generally annular energizer element formed of an elastomeric material to provide a low pressure seal, the energizer element being generally Y-shaped in cross section, including a body portion and first and second leg portions, the body portion including a first axial surface, a first radial surface having one end engaging one end of the first axial surface, a first angled surface having one end engaging the other end of the first radial surface, a second radial surface having one end engaging the other end of the angled surface and a second axial outer surface having one end engaging the other end of the second radial surface, the first leg portion including a second generally angled surface having one end engaging the other end of the second axial surface, a third angled surface having one end engaging the other end of the second angled surface and a third radial surface having one end engaging the other end of the third angled surface, the second leg portion including a fourth generally angled surface having one end engaging the other end of the first axial surface, a fifth generally angled surface having one end engaging the other end of the fourth angled surface to form a sealing lip for engagement with an element to be sealed to define a low pressure sealing lip contact area of a first predetermined axial width, and a fourth radial surface having one end engaging the other end of the fifth angled surface, a generally U-shaped surface extends between the other ends of the third and fourth radial surfaces; and a generally annular heel bearing element formed of a generally rigid material to provide a high pressure seal, the heel bearing element being generally L-shaped in cross section, including a first axial surface, a first radial surface having one end engaging one end of the first axial surface, a second axial surface having one end engaging the other end of the first radial surface, a second radial surface having one end engaging the other end of the second axial surface, a third axial surface having one end engaging the other end of the second radial surface and an angled surface extending between the other ends of the first and third axial surfaces, the seal assembly being installed within the groove with the second axial surface and the second angled surface of the energizer element engaging the axial surface of the groove, with the second radial surface of the energizer element engaging a first portion of the outer radial surface of the groove, with the first radial surface of the heel bearing element engaging a second portion of the outer radial surface of the groove, with the angled surface of the heel bearing element engaging at least a portion of the fourth angled surface of the energizer element and with the first axial surface of the energizer element engaging at least a portion of the third axial surface of the heel bearing element, the second axial surface of the heel bearing element, the first angled surface of the energizer element and a third portion of the outer radial surface of the groove extending between the first and second portions thereof establishing a generally annular void, generally triangular in cross section, whereby upon the application of pressure below a first predetermined limit the sealing lip of the energizer element functions to perform primary sealing and upon the application of pressure at or above the predetermined pressure limit the energizer element is compressed and a portion of the energizer element moves into the annular void, drawing at least a portion of the sealing lip into the groove to reduce the axial width of the low pressure sealing lip contact area and applying radial pressure upon the heel bearing element so that the heel bearing element functions to perform the primary sealing function, the shape and location of the annular void being such that fluid within the annular void is forced out of the annular void and passes between the heel bearing element and the second portion of the outer radial surface of the groove.

4. The seal assembly as recited in claim 3 wherein the first radial surface of the energizer element and the second radial surface and a portion of the third axial surface of the heel bearing element form a second generally annular void generally rectangular in cross section and in communication with the generally triangular shaped void whereby upon the application of pressure at or above the predetermined pressure limit a portion of the energizer element moves into the second annular void.

* * * * *